United States Patent [19]

Uhrhan et al.

[11] 4,178,279

[45] * Dec. 11, 1979

[54] PERMANENTLY STABILIZED POLYURETHANES

[75] Inventors: Paul Uhrhan, Cologne; Harald Oertel, Odenthal; Reinhard Lantzsch, Cologne; Ernst Roos, Odenthal; Dieter Arlt, Cologne, all of Fed. Rep. of Germany

[73] Assignee: Bayer Aktiengesellschaft, Leverkusen, Fed. Rep. of Germany

[*] Notice: The portion of the term of this patent subsequent to Mar. 20, 1996, has been disclaimed.

[21] Appl. No.: 834,762

[22] Filed: Sep. 19, 1977

[30] Foreign Application Priority Data

Sep. 21, 1976 [DE] Fed. Rep. of Germany ....... 2642374

[51] Int. Cl.$^2$ ............................ C08K 5/34; C08K 5/20
[52] U.S. Cl. ............................ 260/45.8 N; 8/178 E; 260/32.6 NR
[58] Field of Search ................. 260/45.8 N, 77.5 SS

[56] References Cited

U.S. PATENT DOCUMENTS

| B408,123 | 4/1976 | Randell et al. | 260/45.8 N |
|---|---|---|---|
| 2,871,226 | 1/1959 | McShane | 260/45.8 N |
| 2,917,486 | 12/1959 | Nelson et al. | 260/45.8 N |
| 3,684,765 | 8/1972 | Matsui et al. | 260/45.8 N |

Primary Examiner—H. S. Cockeram
Attorney, Agent, or Firm—Sprung, Felfe, Horn, Lynch & Kramer

[57] ABSTRACT

The invention is related to modified polyurethanes which have a permanent, wash-fast, acidresistant, dry cleaning-resistant and solvent-resistant stabilization based on 2,2,6,6-tetraalkyl-piperidine light protective agents. These stabilizers are an integral constituent of the polyurethanes, that is to say they take part in the polyurethane synthesis by the reaction of an H-active reactive group (for example $NH_2$, NH-alkyl, CO—NH—$NH_2$, NH—CO—NH—$NH_2$, OH or some other H-active group) of the 2,2,6,6-tetraalkyl-piperidine derivatives with isocyanate groups of polyisocyanates or isocyanate prepolymers.

9 Claims, No Drawings

PERMANENTLY STABILIZED POLYURETHANES

This invention relates to permanently stabilized polyurethanes, i.e. polyurethanes in which the stabilization against degradation, for example due to light, is resistant to extraction because the stabilizers have been chemically linked to the polyurethane by an active hydrogen-containing reaction group.

A series of derivatives of 2,2,6,6-tetraalkylpiperidines has recently proved to be particularly suitable for stabilizing polymers. Some representatives of this series are found to be highly effective in polyurethanes in particular, reducing both the discolouration and the loss of strength on exposure to light (sunlight or UV light).

It was found, however, that the stabilization of polymers, in particular of polyurethane elastomer threads or polyurethane coatings, with derivatives of 2,2,6,6-tetraalkyl-piperidines loses its effect surprisingly quickly when the polymers are treated, for example, with dry cleaning solvents, or dyed in the usual slightly acid dyebaths. In the dyeing processes, moreover, considerable disturbances in the dye absorption occur. For example, only part of the dye is absorbed on the fibre in the normal way while another part is held in solution in the form of a "dye salt" formed between the basic tetraalkyl piperidine derivative and the acid groups of the dye, or the dye precipitates on the surface of the fibre and is easily rubbed off. When PU elastomer filaments or elastomer films which have been extracted with solvents or boiled with acetic acid solution ("blind dyeing") are exposed to light, the stabilization effect disappears completely or almost completely.

In many uses of polymers, however, it is necessary for the stabilization to be resistant to extraction, particularly if the polymers are in the form of shaped products which have a high surface-to-volume ratio, such as filaments or fibres as well as films, coatings and microporous films (synthetic leather).

According to the invention, modified polyurethanes are obtained which have a permanent, wash-fast, acid-resistant, dry cleaning-resistant and solvent-resistant stabilization based on 2,2,6,6-tetraalkyl-piperidine light protective agents. These stabilizers are an integral constituent of the polyurethanes, that is to say they take part in the polyurethane synthesis by the reaction of an H-active reactive group (for example $NH_2$, NH-alkyl, $CO-NH-NH_2$, $NH-CO-NH-NH_2$, OH or some other H-active group) of the 2,2,6,6-tetraalkyl-piperidine derivatives with isocyanate groups of polyisocyanates or isocyanate prepolymers.

The present invention therefore provides permanently stabilized polyurethanes, containing 2,2,6,6-tetraalkyl-piperidine structures chemically attached to the polyurethane molecule by a urethane or urea group.

The term "permanently stabilized polyurethanes" in the context of this invention, means polyurethanes which have undergone a stabilization which cannot be removed by extraction, for example with solvents or aqueous acid solutions.

The invention also provides a process for the preparation of permanently stabilized polyurethanes, characterised in that derivatives of 2,2,6,6-tetraalkyl-piperidine having an H-active reaction group are added to the reaction mixture used for the preparation of the polyurethane from polyhydroxyl compounds, polyisocyanates and chain-lengthening agents.

The preferred H-active reaction groups are the $NH_2$ group, the NH-alkyl group, the NH-aryl group, the $CO-NH-NH_2$ group, the $OCO-NH-NH_2$ group, the $NH-CO-NH-NH_2$ group and the OH group. The compounds are generally used in stabilizing quantities of from 0.05 to 5% by weight, preferably from 0.1 to 2.0% by weight, based on the sum of reactants, and are thus built into the polyurethane.

The H-active reactive group of the 2,2,6,6-tetraalkyl-piperidine derivatives is a group which is normally reactive towards isocyanate groups, for example a primary or secondary amino group, a hydrazide, a semicarbazide or a carbazic ester group. These groups react very rapidly with isocyanates even at room temperature. The OH group is also a suitable reactive group. Those H-active reactive groups which undergo more than 98% reaction with an aromatic isocyanate (phenyl isocyanate or diphenylmethane-4,4'-diisocyanate) in less than one hour in dimethylformamide solution at a reaction temperature of 50° C. are generally very suitable.

Suitable 2,2,6,6-tetraalkyl-piperidine derivatives (TAP derivatives) containing an H-active reactive group include in particular those represented by the following structures (I), (II) and (III):

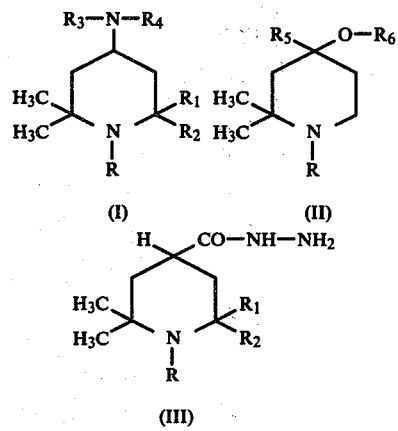

In these general formulae (I) to (III),

R represents hydrogen, straight chain or branched chain alkyl groups with 1 to 20 C-atoms, alkenyl groups with 3 to 5 C-atoms, aralkyl groups with 7 to 12 C-atoms and $CH_2-CH_2-CN$, $CH_2-CH_2-COOalkyl$, and

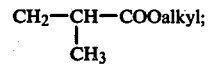

hydrogen and the methyl group are preferred. R may also have the meaning indicated below.

$R_1$ and $R_2$, which may be identical or different, each represent a straight chain or branched chain alkyl group with 1 to 6 C-atoms or, together with the ring carbon atom to which they are attached, they represent a cycloalkyl ring having from 5 to 7 C-atoms; $R_1$ and $R_2$ are preferably methyl groups;

$R_3$ represents hydrogen, a straight chain or branched chain alkyl group with 1 to 20 C-atoms, a cycloalkyl group with 5 to 12 C-atoms, an aralkyl group with 7 to 12 C-atoms, an ω-cyanoalkyl group or an alkoxy carbonylalkyl group preferably having 1 to 3 C-atoms in the alkoxy part; $R_3$ is preferably hydrogen, a $C_1$-$C_{12}$ alkyl group, a cyclohexyl group, a β-cyanoethyl group, a $CH_2$-$CH(CH_3)$—$COOCH_3$ group or a $CH_2$—$CH_2$—$COOCH_3$ group;

$R_4$ represents hydrogen or CO—NH—$CH_2$ or, when $R_3$=H, a straight chain or branched chain alkyl group with 1 to 20 C-atoms, a cycloalkyl group with 5 to 12 C-atoms, an aralkyl group with 7 to 12 C-atoms, an ω-cyanoalkyl group or a β-alkoxy-carbonylalkyl group with preferably 1 to 3 C-atoms in the alkoxy part; or, when $R_3$ is not H, an ω-aminoalkyl, an ω-N-alkylaminoalkyl, an ω-hydroxyalkyl or an ω-carboxylic acid-hydrazidoalkyl group; $R_4$ is preferably hydrogen or, when $R_3$=H, an alkyl group with 1 to 8 C-atoms, a cyclohexyl group, the ω-cyanoethyl group or an ω-alkoxycarbonyl-ethyl group with 1 to 3 C-atoms in the alkoxy part; and, when $R_3$ is not H, the ω-aminoethyl, the ω-hydroxyethyl, the ω-hydroxypropyl or the propionic acid hydrazide group;

$R_5$ represents hydrogen or CN;

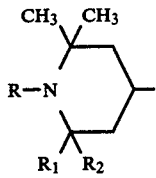

$R_6$ represents hydrogen, β-hydroxyalkyl, β- or γ-aminoalkyl, $CH_2$—$CH_2$—CO—NH—$NH_2$ or $CH_2$—$CH(CH_3)$—CO—NH—$NH_2$; $R_6$ is preferably hydrogen, $CH_2$—$CH_2$—OH, $CH_2$—$CH(CH_3)$—OH, $CH_2$—$CH_2$—$CH_2$—$NH_2$ or $CH_2$—$CH_2$—CO—NH—$NH_2$.

When the groups $R_3$ and $R_4$ or $R_5$ and $R_6$ in formulae (I) and (II) do not carry an H-active reactive group and are not hydrogen, the H-active reactive group may be contained in the group R. R is in that case preferably the ω-aminoalkyl, β-hydroxyalkyl or β-carboxylic acid hydrazidoalkyl group, most preferably the $(CH_2)_3$—$NH_2$, $(CH_2)_2$—OH or $CH_2$—$CH_2$—CO—NH—$NH_2$ group.

The groups $R_3$, $R_4$, $R_5$ and $R_6$ containing no H-reactive group may be straight chain or branched chain alkyl groups, cycloalkyl groups, aralkyl groups, ω-cyanoalkyl groups or ω-alkoxycarbonyl-alkyl groups; they are preferably alkyl or cycloalkyl groups.

The following are given as examples of derivatives of 2,2,6,6-tetraalkyl-piperidines containing an H-reactive group which may be used according to the invention (the hydrogen atom which is reactive with NCO is underlined in each case):

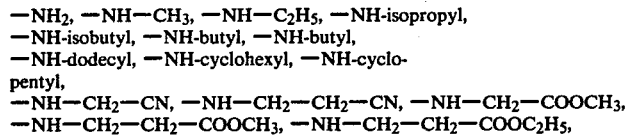
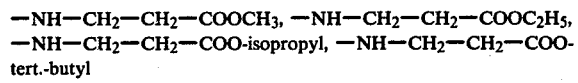
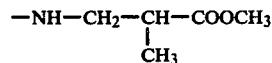
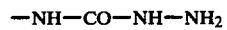
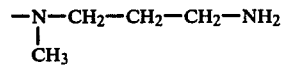
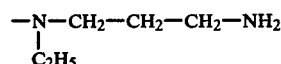
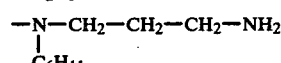
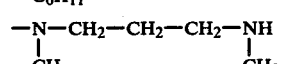
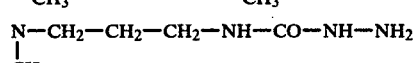
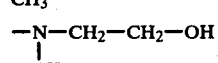
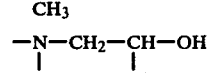
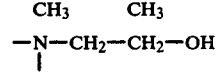
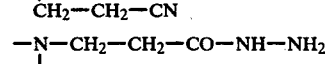
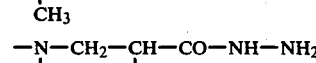
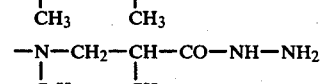

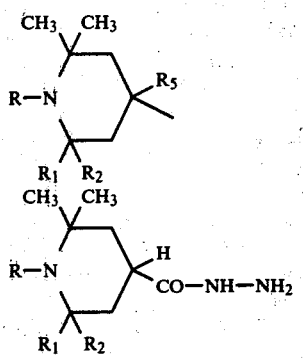

-continued
—OH, —O—CH$_2$—CH$_2$—OH, —O—CH$_2$—CH(CH$_3$)—OH,
—O—CH$_2$—CH$_2$—NH$_2$, —O—CH$_2$—CH$_2$—CH$_2$—NH$_2$,
—O—CH$_2$—CH$_2$—CH$_2$—NHalkyl,
—O—CH$_2$—CH$_2$—CO—NH—NH$_2$,
—O—CH$_2$—CH(CH$_3$)—CO—NH—NH$_2$ wherein
R has the meaning indicated above but is preferably H, methyl or allyl, most preferably H or methyl;
R$_1$ and R$_2$ are preferably methyl; and
R$_5$ represents H or CN, preferably hydrogen.

The following are examples of compounds containing the H-reactive groups in the group R:

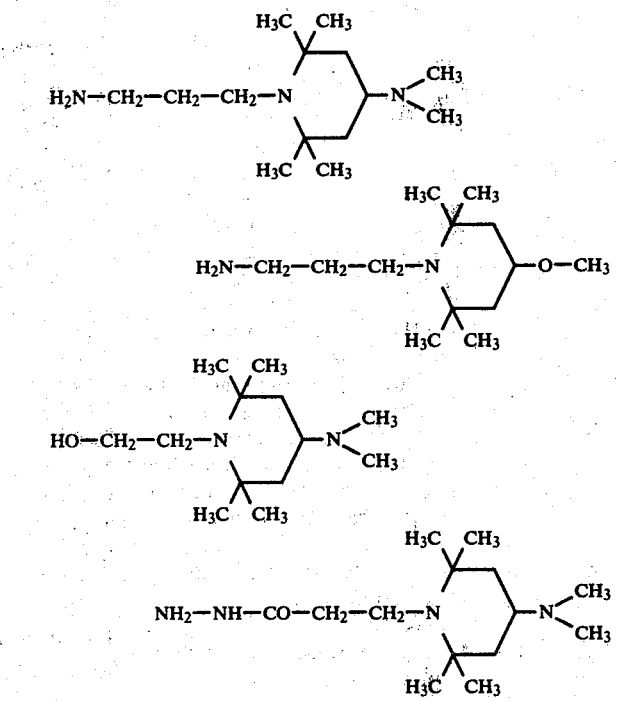

Some of the 2,2,6,6-tetraalkyl-piperidines with an H-active reactive group which may be incorporated in the polyurethane are already known in the literature. Others may be synthesised by known methods (see methods of preparation).

Among the group of compounds represented by the general formulae (I) to (III), those compounds of group (I) having the N-substitution in the 4-position of the piperidine ring are particularly preferred becuase they are especially active. Compounds having the OH group in the 4-position have a much weaker stabilizing effect.

The quantity of reactive stabilisers incorporated according to the invention generally depends on the nature of the polyurethane, the method used for its synthesis and the special use to which the stabilized polyurethane is to be put. The amount may vary from 0.05 to 5.0% by weight, based on the polyurethane solids content and is preferably between 0.1 and 3.0% by weight, most preferably between 0.1 and 2.0% by weight. One particularly advantageous feature is that the chemical incorporation of only 0.1 to 0.5% by weight of the tetraalkyl-piperidine is sufficient to produce an excellent permanent stabilization of polyurethane against degradation by light and heat. A substantial increase in the quantity used very often produces no marked increase in the effect. By contrast, stabilization with phenolic antioxidants, for example, requires much larger quantities of stabilizer, ranging from 1.5 to 2%, to produce sufficient stabilization and the effect is nevertheless inferior to the stabilization obtained according to the invention.

The excellent protection against discolouration and degradation achieved by the incorporation of the reactive stabilizer can be further increased and put on a broader basis by the addition of UV stabilizers and/or phenolic antioxidants.

Thus, polyurethanes containing about 0.2 to 0.5% by weight of TAP-reactive stabilizers built into the molecule according to the invention can be further stabilized by the addition of about 0.5 to 1.5% by weight of phenolic stabilizers or UV absorbents or optionally mixtures of phenolic stabilizers and UV absorbents (for example in proportions of between about 1:1 and 4:1). The predominant stabilizing effect however, is produced by the reactive stabilizers.

The following are examples of conventional stabilizer additives: antioxidants of the sterically hindered phenol type, e.g. 2,6-di-tert.-butyl-p-cresol; 4,4'-thiobis-(6-tert.-butyl-3-methyl-phenol); 2,2'-thiobis-(6-tert.-butyl-4-methyl-phenol); α,α'-bis-(2-hydroxy-3,5-dialkyl-phenyl)-p-diisopropylbenzenes; α,α'-bis-(2-hydroxy-3,5-dialkyl-phenyl)-m-diisopropylbenzenes; 2,2'-methylene-bis-(4-methyl-6-tert.-butyl-phenol); 2,2'-methylene-bis-(4-methyl-6-cyclohexyl-phenol); 1,1,3-tris-(5-tert.-butyl-4-hydroxy-2-methyl-phenyl)-butane; tetrakis-(3,5-di-tert.-butyl-4-hydroxy-phenyl-propionyloxymethyl)-methane; other compounds of divalent sulphur, e.g. dilaurylthiodipropionate; compounds of trivalent phosphorus, e.g. triphenylphosphite, tris-(p-nonyl-phenyl)phosphite; UV absorbents based on 2-(2'-hydroxyphenyl)-benzotriazole, e.g. 2-(2'-hydroxy-5'-methyl-phenyl)-benzotriazole and 2-(3',5'-di-tert.-butyl-2'-hydroxyphenyl)-5-chlorobenzotriazole; UV absorbents based on benzophenone, e.g. 2-hydroxy-4-octoxybenzophenone; 2',4'-di-tert.-butyl-phenyl-3,5-di-tert.-butyl-4-hydroxybenzoate; cyanoacrylic acid esters, e.g. α-cyano-β-methyl-β-(p-methoxyphenyl)-acrylate, and other light-protective agents such as 2,2'-thiobis-(4-tert.-octyl-phenolate)-n-butylamine-nickel. Other representatives are given in German Auslegeschrift No. 2,349,962, columns 17 to 20.

Polymers or copolymers of N,N-dialkylaminoethyl-(meth)-acrylates may also be used for improving the dye absorption and resistance to light and chlorine.

For certain purposes of application, the quantity of reactive stabilizer to be built into the polyurethane during its synthesis is limited by the chain-breaking effect (in the polymer synthesis) of the monofunctional tetraalkyl piperidines having an H-reactive group.

The use of monofunctional "regulators" or "chain breakers" in the synthesis of polyurethane is known per se and leads, for example, to polyurethane solutions which have a reduced tendency to solidify in the form of gels and may also have improved dye absorption (in the case of tertiary amines) as well to a certain stabilizing effect (for example in the case of asymmetrical dimethyl hydrazine), depending on the structure of the chain breaker.

The incorporation of the TAP stabilizers in accordance with the invention, however, produces a much better stabilizing effect than any previously known "chain breakers" (see comparison Example 4). At the same time, the process according to the invention results in an improvement in the dye absorption since the basic groups of the tetraalkyl piperidine residue bind the acid dyes which are preferably used; in addition, the usual regulating function and effect on the viscosity are provided.

The stabilizing properties of tetraalkylpiperidine derivatives are surprisingly found to be unaffected by the fact that the stabilizer is built into the polyurethane. Quantities as little as 0.5% by weight are sufficient to produce a stabilizing effect which is not only better than that obtained with any known types of stabilizers but also resistant to extraction. In addition, the dye absorption of the polyurethanes with acid dyes is increased according to the number of secondary or tertiary amines in the stabilizer.

The stabilization according to the invention by means of tetraalkyl-piperidine stabilizers chemically built into the polyurethanes enables the use of 2,2,6,6-tetraalkyl-piperidine-stabilized polyurethanes to be extended to critical fields such as the manufacture of packaging films which are to come into contact with foodstuffs. The previously known low molecular weight tetraalkylpiperidine stabilizers used as additives in polyurethanes are easily extracted from polyurethane foils when brought into contact with dilute acids (for example acetic acid or citric acid) or solvents and fats.

It is particularly suitable to use the reactive stabilizers in shaped polyurethane products which have a relatively large surface area, in particular fibres and filaments, foils, coatings or synthetic leather. In these products, the advantages achieved by the invention are fully apparent, for example the resistance to extraction, the physiologically harmless fixation of the stabilizer in the polyurethane and the stability to boiling, dyeing, washing and chemical cleaning. The process according to the invention is particularly advantageous for stabilizing pigmented polyurethanes, particularly in the form of polyurethane elastomer fibres. These advantages of the invention have already been described above and are demonostrated in detail in the Examples and compared with the state of the art. Another reason why chemical linkage of the stabilizer with the polyurethane is particularly advantageous is that, in the dry spinning process, the usual stabilizers are to a large extent volatile at the high spinning air temperatures (for example 250° to 300° C.) and evaporate off with the dimethylformamide or dimethylacetamide solvent. This is true even of relatively high molecular weight UV absorbents, for example the 2-(2'-hydroxyphenyl-3,5-dialkyl)-benzotriazole derivatives such as Tinuvin 327 or Tinuvin 328 of Ciba-Geigy (Tinuvin is a Trade Mark). This danger does not arise when stabilization is carried out according to the invention.

It was extremely surprising that compounds of 2,2,6,6-tetraalkyl-piperidine (TAP) do not react with isocyanates through the piperidine-NH group under the conditions employed for polyurethane synthesis (reaction temperature below 100° C., use of solvents) to form the corresponding urea derivative but that instead the reaction takes place almost exclusively on the H-active reactive group. This preserves the stabilizing action of 2,2,6,6-tetraalkyl-piperidine, since the $N_1$-acyl derivatives of these piperidines (for example ureas obtained by reaction with isocyanates) have a much reduced stabilizing effect for polyurethanes.

The $N_1$-alkyl derivatives of 2,2,6,6-tetraalkyl-piperidines (I to III, R is not H) also have the stabilizing effect but are not reactive under the "harsh" reaction conditions of isocyanate reactions in polyurethane synthesis (for example, isocyanate reactions in the melt above 100° C., such as solvent-free polyurethane syntheses or isocyanate reactions in catalysed or uncatalysed reactive systems as used for the formation of foams or integral foams) and therefore retain their effect as stabilizers. For this reason, the N-alkyl substituted types of tetraalkyl-piperidine derivatives (I to III, R is not H) are preferred in "harsh" reaction systems. The N-alkyl derivatives (I to III, R is not H) are also preferable to NH-piperidine derivatives for the reaction of polyurethanes in solvents because they eliminate the possibility of unwanted side reactions.

The linear or branched polyurethanes, which may be in the form of foams, are produced from the known starting materials by known processes. They are generally synthesised by any of numerous known and modifiable processes involving one or more stages carried out in solvents or solvent-free, in which higher molecular weight polyhydroxyl compounds (e.g. polyesters or polyethers having a molecular weight of about 500 to 50,000 and melting points of preferably below 60° C.) and aliphatic, araliphatic or aromatic polyisocyanates (preferably aromatic diisocyanates such as tolylene diisocyanates or diphenylmethane-4,4'-diisocyanate) and so-called chain-lengthening agents, i.e. low molecular weight compounds (molecular weight e.g. 18 to 400) having two or more isocyanate reactive groups (e.g. water, low molecular weight diols, diamines, hydrazine, dihydrazides or similar compounds such as amino alcohols, amino hydrazides, hydroxy hydrazides, aminosemicarbazides, semicarbazide hydrazides, semicarbazide carbazic esters or mixtures of these chain-lengthening agents) are reacted together.

The following are examples of starting materials for polyurethane synthesis: polyesters of adipic acid and dihydric alcohols having from 2 to about 10 C-atoms, preferably more than 5 C-atoms, the dihydric alcohols being optionally used as mixtures to lower the melting points of the polyesters; polyesters of caprolactone and dihydric alcohols; polyalkylene ether diols; special polytetramethylene ether diols; polytrimethylene ether diols; polypropylene glycol or the corresponding copolyethers. The diisocyanates used are preferably aromatic diisocyanates such as diphenylmethane-4,4'-diisocyanate, tolylene diisocyanate, araliphatic diisocyanates such as m-xylylene diisocyanate or aliphatic diisocyanates such as hexamethylene diisocyanate, dicyclohexylmethane-4,4'-diisocyanate and isophorone diisocyanate. These starting materials are reacted to produce isocyanate prepolymers, optionally with the addition of dialcohols, these prepolymers preferably having the structures indicated in Belgian Pat. No. 734,194. The chain-lengthening agents used, optionally as mixtures or in a stepwise reaction, may be water and/or dihydric or trihydric alcohols such as butanediol, p-xylylene glycols or trimethylolpropane; amino alcohols such as ethanolamine; diamines such as diphenylmethane-4,4'-diamine or 3,3'-dichloro-diphenylmethane-4,4'-diamine; preferably, however, aliphatic diamines such as ethylene diamine, 1,2-propylene diamine, isophorone diamine, 1,3-diaminocyclohexane and meta-xylylenediamine as well as hydrazine or dihydrazides such as carbodihydrazide, oxalic acid dihydrazide, glutaric acid dihydrazide, pimelic acid dihydrazide, terephthalic acid dihydrazide, β-alanylhydrazide or semicarbazide hydrazides such as β-semicarbazide-alanyl hydrazide. These chain-lengthening agents may, if desired, be used as mixtures.

The incorporation into the polyurethanes of the 2,2,6,6-tetraalkyl-piperidine derivatives having an H-reactive group may be carried out at any stage of the formation of the polyurethane. The reactive stabilizers may be mixed with the polyhydroxyl compounds and then reacted with polyisocyanates and optionally other H-active chain-lengthening agents (e.g. diols or diamines) to produce the polyurethane product directly (for example, to produce polyurethane elastomers). Alternatively, the reactive stabilizers may be used as a component of a foam formulation for the production of polyurethane foams, for example for elastic soft foams, semirigid or rigid foams or so-called integral foams or shaped products.

These reactions to produce casting elastomers or foams generally require so-called "harsh" reaction conditions for the isocyanate reaction, that is to say temperatures above 100° C., which may rise to as much as 180° C., for example, for the production of foams, or even higher (for solvent-free production of polyurethane elastomers).

The reactive stabilizers (I) to (III) in which R is not H are preferably used in such cases because stabilizers in which R=H are liable to undergo partial or complete reaction with isocyanates on their piperidine group at high temperatures, whereby their effect would be reduced.

A preferred field of application for the reactive stabilizers lies in the synthesis of substantially linear segmented polyurethanes which are synthesised in solvents or shaped from solution to form products such as fibres, foils or coatings, preferably using highly polar solvents such as dimethylformamide, dimethylacetamide or dimethyl sulphoxide.

When the reaction in solvents is carried out under the usual reaction conditions at relatively low temperatures, below, say, 100° C. and in most cases below about 60° C., controlled incorporation of the reactive stabilizers can be achieved even when using the compounds (I) to (III) in which R=H.

When the reactive stabilizers of formulae (I) and (II) containing OH as the reactive group are used, they are preferably incorporated at the stage of isocyanate prepolymer formation because they are incorporated by relatively slow OH/OCN reactions.

Reactive stabilizers containing the highly reactive aliphatic amino groups or a hydrazide group are preferably reacted with the isocyanate prepolymers in highly polar solvents together with the diamine or dihydrazide derivatives during the chain-lengthening reaction, or they may be incorporated by any modification of a stepwise reaction. For example, the reactive stabilizers may be added after the reaction of the chain-lengthening agent, the stabilizers then reacting with the isocyanate prepolymers to form a segmented polyurethane.

The reactions may be carried out by the usual continuous or intermittent methods, that is to say the reactants, isocyanate prepolymer (solution) and chain-lengthening agent, are vigorously mixed with the reactive stabilizer solution. The stabilizers containing NH groups are preferably employed as freshly formed carbamate dispersions (produced by introduction of $CO_2$ into the DMF solution of the amine) and reacted in this form with the isocyanate prepolymers.

The preferred segmented polyurethanes obtained from the reaction of an isocyanate prepolymer OCN—Y—NCO with a chain-lengthening agent $H_2N$—X—$NH_2$ give rise to substantially linear segments which are soluble in highly polar solvents and can be characterised by the following formula section:

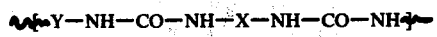

In this formula, Y is the residue of an isocyanate prepolymer obtained from a higher molecular weight polyhydroxyl compound, preferably a dihydroxy compound having a molecular weight of from 500 to 5000 and melting points below 60° C. (for example the residue of a polytetramethylene ether or of a polyester) with excess molar quantities of a diisocyanate, optionally with the addition of minor quantities of low molecular weight polyols in addition to the dihydroxy compound (see also Belgian Pat. No. 734,194).

X is the residue of a divalent chain-lengthening agent containing $NH_2$ end groups without these $NH_2$ end groups, for example an aliphatic, araliphatic, aromatic or heterocyclic group, an NH—CO—alkylene—CO—NH group, an NH—CO—NH(CH$_2$)$_2$—CO—NH group or a bond between two N atoms. The synthesis of such polyurethanes or polyurethane ureas has been described in some detail, for example in German Auslegeschrift No. 1,270,276 and in Belgian Pat. No. 734,194.

Built into the stabilized polyurethanes are segments in which the isocyanate group of a diisocyanate or isocyanate prepolymer is attached to the reactive group of the H-reactive tetraalkyl-piperidine stabilizer.

These structural elements may be represented, for example, by the following formulae:

Y—NH—CO—

-continued
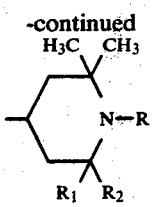

(NH—NH—CO—O—..........)
(NH—NH—CO—NH—..........)
(NH—NH—CO-alkylene-N(R₃)—)
(NH-alkylene.......N(R₃)—)
(O-alkylene........N(R₃)—)

In the above formulae, Y—NH—CO is the residue of the isocyanate prepolymer, and the piperidino ring is the residue of the reactive stabilizer.

The residues indicated by dotted lines correspond to the formulae as defined for $R_3$, $R_4$, $R_5$ and $R_6$ for the reactive stabilizers (I) to (III).

The following formulae represent typical and preferred examples of segments of isocyanate prepolymers and reactive stabilizers:

for group (I)

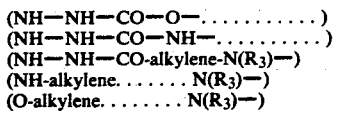 $R=H; CH_3$ for group (II)

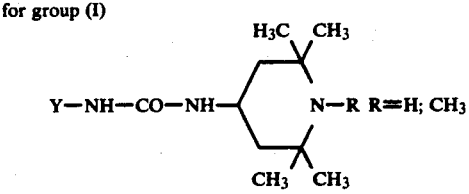

for group (III)

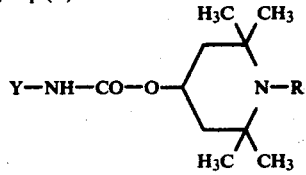

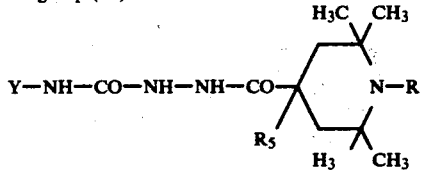

These polyurethane segments carrying H-reactive stabilizers act as monofunctional chain regulators. Their quantity determines the maximum attainable molecular weight of the polyurethanes. For most practical purposes, it is desirable to have molecular weights such that the intrinsic viscosity ($\eta i = \ln \eta rel/C$; $\eta rel$ = relative viscosity, C = concentration in g/100 ml; solvent hexamethylphosphoramide, measuring temperature 25° C.) $\eta \geq 0.8$, preferably $\geq 1.0$. An increase in molecular weight may be obtained by incorporating small quantities of trifunctional components in the polyurethane (e.g. trimethylolpropane or 1,5,11-triaminoundecane) as compensation for the chain-breaking action of reactive stabilizers. When relatively large quantities of monofunctional reactive stabilizers are used e.g. $\geq 1.5\%$) it is generally advisable to modify the polyurethane structure accordingly by increasing the branching reactions if one wishes to maintain the molecular weight of the polyurethanes at the desired level (for example $\eta i \geq 0.8$).

The polyurethane solutions are generally applied to glass plates at concentrations of about 20% to form layers about 0.6 to 0.8 mm in thickness, using a doctor wiper, and then dried in a drying cupboard (about 30 minutes at 70° C. plus about 45 minutes at 100° C.). The films are lightly powdered with talcum and then stripped off. They are exposed to light either as strips about 1 cm in width and/or in the form of cut staple fibres. The produce the cut fibres, the films are cut to a titre of about 300 dtex in a cutter machine with a set of knives.

The solutions may be wet spun in aqueous coagulation baths (for test purposes, for example, through a 20/0.12 mm die into an 80/20 water/DMF bath at 80° C., draw-off rate 10 m/min) and dried after passage through washing baths. The solutions may be dry spun at a slightly elevated temperature (about 60° C.) through spinning dies into a heated spinning shaft supplied with a direct current of hot air, and they may then be drawn off at a rate of about 100 to 450 m/min. For test purposes, the fibres are spun through 16/0.2 mm dies, drawn from the spinning shaft at the rate of 100 m/min, dressed with talcum and wound on spools at 130 m/min. The spools are heated to 130° C. for one hour.

For Fadeometer exposure, strips of foil or the fibres are exposed on cardboard supports in the Fadeometer. All the samples of an experimental group given in the Examples are placed simultaneously into the exposure chamber so that they are all exposed to comparable intensities of light even if the light fluctuates.

The extraction treatments are carried out as indicated on foils or on spun fibres in the form of lightly wound packages on frames. Drying is carried out at room temperature or in a water jet vacuum at 50° C. $\eta i$-value: The molecular weight is determined in terms of the $\eta i$-value. 1 g of polymer (calculated as pigment-free polymer) is dissolved in 100 ml of hexamethylphosphoramide (HMPA) at room temperature with shaking. The solution is filtered through a coarse glass frit and the relative solution viscosity is measured in an Ubbelohde viscosimeter at 25° C.

$$\eta i = \frac{\ln \eta R}{C}$$

$\eta_R$ = relative solution viscosity, C = concentration in g/100 ml.

Dyeings

The fibres were heated to boiling with 2% by weight of the red dye, Colour Index No. 23 635, in 1% acetic acid solution for one hour. In the following preparations, all parts are by weight.

Preparation of tetraalkyl-piperidines having an H-reactive group

I. N-substituted 4-amino-2,2,6,6-tetramethyl-piperidines represented by the formula:

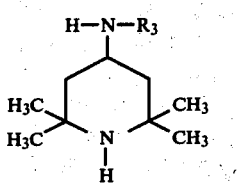

Table 1

| Method of Preparation No. | Amine used | $R_3$ | B.P./mm Hg (°C.) |
|---|---|---|---|
| 1 | $CH_3-NH_2$ | $CH_3-$ | 53/0.4 |
| 2 | $CH_3CH_2CH_2-NH_2$ | $CH_3-CH_2-CH_2-$ | 110/16 |
| 4 | $n-C_6H_{13}-NH_2$ | $n-C_6H_{13}-$ | 75-85/0.2 |
| 3 | cyclohexyl-$NH_2$ | cyclohexyl- | 84-86/0.3 |
| 5 | $n-C_{12}-H_{25}-NH_2$ | $n-C_{12}H_{25}-$ | 154/0.3 |
| 6 | $CH_3-CO-CH_3$ | $iso-C_3H_7-$ | M.P. 105° C. |
| 7 | $(CH_3)_2CH-CHO$ | $(CH_3)_2CH-CH_2-$ | 70/0.1 |
| 8 | $CH_3-CO-CH_2-CH(CH_3)_2$ | $iso-C_6H_{13}$ | 80/0.15 |
| 9 | $C_6H_5-CHO$ | $C_6H_5-CH_2-$ | 116-2/0.2 |

Variation A

About 1 to 5 mol of a primary amine (preferably 3 mol), 1 mol of triacetone amine.H$_2$O in one of the usual solvents used for hydrogenation (for example methanol or tetrahydrofuran), 1 ml of acetic acid and 20 to 30 g of Raney nickel or Raney cobalt are introduced into a 1.3 liter hydrogenation autoclave flushed with nitrogen. The reaction mixture is heated to about 80° to 120° C. with 80 bar of H$_2$ and hydrogenated at a hydrogen pressure of 120 to 150 bar. When no more hydrogen is taken up, the reaction mixture is left to cool, the pressure is released, the catalyst is filtered off and the solvent is evaporated. The amine is purified by distillation.

This method can be used, for example, for obtaining the 4-amino-2,2,6,6-tetramethylpiperidines shown in Table 1.

Variation B

156 Parts (1 mol) of 4-amino-2,2,6,6-tetramethyl-piperidine, 1 to 10 mol of the appropriate aldehyde or ketone, 1 ml of acetic acid and 20 to 30 g of Raney nickel or Raney cobalt are introduced into a 1.3 liter hydrogenation autoclave flushed with nitrogen. (In the case of expensive carbonyl compounds, hydrogenation may be carried out in one of the usual hydrogenation solvents, e.g. methanol or tetrahydrofuran). The reaction mixture is heated to about 80° to 120° C. with 80 bar of H$_2$ and the reaction is continued to completion at a hydrogen pressure of 120 to 150 bar. When uptake of hydrogen ceases, the reaction mixture is cooled and worked up as described under Variation A. This method can be used, for example, for obtaining the 4-amino-2,2,6,6-tetramethyl piperidines shown in Table 2.

(10) 4-(β-Cyanoethyl)-amino-2,2,6,6-tetramethylpiperidine

I, R=H; $R_1=R_2=CH_3$; $R_3=H$, $R_4=CH_2-CH_2-CN$.

156 parts of 4-amino-2,2,6,6-tetramethyl-piperidine (see German Offenlegungschrift No. 2,412,750) are introduced into the autoclave, 132.5 parts of acrylonitrile are added dropwise and the mixture is heated to 80° C. for 3½ hours. Excess acrylonitrile is then distilled off and the residue is fractionated under vacuum. 190 Parts of 4-(β-cyanoethyl)-amino-2,2,6,6-tetramethyl-piperidine are obtained, boiling point 107° to 114° C./0.04 Torr.

(11) 4-Alkyl, 4-(β-hydroxyalkyl)-amino-2,2,6,6-tetraalkylpiperidines $R_3$=alkyl, cycloalkyl, aralkyl; $R_4$=β-hydroxyalkyl, preferably $CH_2-CH_2-OH$, $CH_2-CH(CH_3)-OH$.

GENERAL METHOD OF PREPARATION

1 Mol of the 4-alkylamino-tetraalkyl-piperidine (for example 1 to 9 of Tables 1 and 2) is heated to a temperature of 120° to 150° C. and from 1 to 1.1 mol of ethylene oxide (or propylene oxide or isobutene oxide) are passed in or added dropwise, preferably in a pressure vessel. After fractional distillation, the 4-N-alkyl—4-(β-hydroxyalkyl) derivatives are obtained by high vacuum distillation.

(12) 4-Alkyl-4-(γ-aminopropyl)-amino-2,2,6,6-tetralkyl-piperidines $R_3$=alkyl, cycloalkyl, aralkyl, $R_4$=$(CH_2)_3-NH_2$ 1 Mol of the 4-alkylamino-2,2,6,6-tetraalkylpiperidine is heated with 1.5 mol of acrylonitrile to 80°-100° C. for 3 to 5 hours. The 4-alkyl-4-(β-cyanoethyl)-amino-2,2,6,6-tetraalkyl-piperidines are obtained by fractional distillation and then reduced to the 4-alkyl-4-(γ-aminopropyl)-amino compounds in methanolic solution in the presence of liquid ammonia and 15 to 25 g of Raney nickel at 100° C. and 80 to 100 bar of hydrogen pressure.

For example, 97 parts of 4-methyl-(γ-aminopropyl)-amino-2,2,6,6-tetramethyl-piperidine are obtained as a colourless liquid boiling at 98° to 100° C./0.03 Torr from 112 parts of 4-methyl-4-(β-cyanoethyl)-amino-2,2,6,6-tetramethyl-piperidine (B.P. 100° C./0.05 Torr).

(13) 4-Hydroxy-4-carboxymethyl-2,2,6,6-tetramethyl-piperidine is obtainable according to German Pat. No. 90 245.

(14) 4-Hydroxy-2,2,6,6-tetramethyl-piperidine is obtainable by reduction of 4-oxo-tetramethyl-piperidine [J.Org.Chem. 27, 1699 (1962)] and can be converted into the derivatives of group (II) compounds by alkoxylation or cyanoethylation followed by reduction.

(15) 4-Amino-1,2,2,6,6-pentamethyl-piperidine

750 Parts of 4-benzoylamino-1,2,2,6,6-pentamethyl-piperidine are dissolved in 1000 parts of concentrated hydrochloric acid and the solution is boiled under reflux for 10 hours. Sodium hydroxide solution is added after cooling until the reaction is alkaline, and the mixture is repeatedly extracted with methylene chloride. The residue left after evaporation of methylene chloride is distilled under vacuum; 300 parts of 1,2,2,6,6-pentamethyl-4-amino-piperidine boiling at 98° C./15 Torr are thereby distilled over.

(16) 4-Amino-1-allyl-2,2,6,6-tetramethylpiperidine

164 Parts of 4-amino-1-allyl-2,2,6,6-tetramethyl-piperidine boiling at 112° C./15 Torr are obtained from 300 parts of 4-benzoylamino-1-allyl-2,2,6,6-tetramethyl-piperidine by the same method as described under 15.

(17) 4-Amino-1-ethyl-2,2,6,6-tetramethylpiperidine

Using Method 15, 130 parts of 4-amino-1-ethyl-2,2,6,6-tetramethylpiperidine boiling at 105°–107° C./15 Torr are obtained from 288 parts of 4-benzoylamino-1-ethyl-2,2,6,6-tetramethylpiperidine.

(18) 4-Amino-1-benzyl-2,2,6,6-tetramethylpiperidine 218 parts of 4-amino-1-benzyl-2,2,6,6-tetramethylpiperidine boiling at 110° C./0.1 Torr are obtained by Method 15 from 350.5 parts of 4-benzoylamino-1-benzyl-2,2,6,6-tetramethylpiperidine.

(19) 4-(β-Cyanoethyl)-amino-1,2,2,6,6-pentamethylpiperidine

170 Parts of 1,2,2,6,6-pentamethylpiperidine are introduced into the reaction vessel and 132.5 parts of acrylonitrile are added dropwise. When the resulting mixture has been stirred for 3 hours at 70° C., it is fractionated under vacuum, 180 parts of 4-(β-cyanoethyl)-amino-1,2,2,6,6-pentamethylpiperidine, boiling point 115°–117° C./0.08 Torr, being obtained.

In the following Examples, all parts indicated are parts by weight and percentages are percentages by weight unless otherwise indicated. The percentages of pigmentation are based in all cases on the solids content. The isocyanate content given is based on the quantity of solid material.

EXAMPLE 1

Isocyanate prepolymer formation

600 Parts of a polytetramethylene ether diol having a molecular weight of 2000 (Polymeg 2000 of Quaker Oats Company) are heated to 30°–45° C. with 135.8 parts of diphenyl methane-4,4'-diisocyanate and 184 parts of dimethylformamide (DMF) for 40 minutes with the addition of 1 ml of a 30% solution of $SO_2$ in DMF, and the reaction mixture is then cooled in an ice bath. The isocyanate content of the resulting isocyanate prepolymer solution is 2.06%.

(A) Chain lengthening with ethylene diamine (Comparison experiment without the molecular incorporation of stabiliser)

1.585 Parts of ethylene diamine are dissolved in 307 parts of dimethylformamide and cooled to 10° C., and 3 parts of $CO_2$ dry ice are added to form a finely divided carbamate suspension. 100 Parts of the above mentioned isocyanate prepolymer solution are introduced within a few minutes with vigorous stirring to form a clear, homogeneous, colourless elastomer solution, which is subsequently pigmented with 4% of $TiO_2$ (based on the solids content). The ηi-value (see B) is 1.18 and the solution viscosity is 380 poises/20%.

(B) Chain lengthening with 95 mol% of ethylene diamine/5 mol% of 4-amino-2,2,6,6-tetramethyl-piperidine 3 Parts of $CO_2$ dry ice followed by 107.5 parts of the above isocyanate prepolymer solution are introduced into a solution of 1.508 parts of ethylene diamine and 0.413 parts of 4-amino-2,2,6,6-tetramethyl-piperidine (under the reaction conditions chosen, it reacts only through the 4-amino group), and the colourless, clear, homogeneous solution obtained is pigmented with 4% of $TiO_2$.

The solution has a viscosity of 153 poises/c=21% and is worked up into foils (as in Comparison Experiment A) (ηi-value 1% in HMPA/25° C.=1.0). The proportion of stabilizer built into the polyurethne is about 0.47% by weight based on the polyurethane solid material.

(C) Chain lengthening with 90 mol% of ethylene diamine/10 mol % of 4-amino-2,2,6,6-tetramethyl-piperidine.

3 Parts of $CO_2$ dry ice followed by 107.5 parts of the above isocyanate prepolymer solution are introduced into a solution of 1.43 parts of ethylene diamine and 0.826 parts of 4-amino-2,2,6,6-tetramethyl-piperidine in 308 parts of dimethylformamide to form a homogeneous, clear, colourless elastomer solution which is subsequently pigmented with 4% of $TiO_2$. The solution has a viscosity of 13.6 poises/c=21%. The stabilizer content in the polyurethane is about 0.94% by weight. The secondary amine content (from the built in stabilizer) in the fibres is about 63 milliequivalents of NH per kg of elastomer material (see dyeing tests).

The preparation Examples B and C show that under the reaction conditions of chain lengthening to form the polyurethane, surprisingly, only the primary 4-amino group reacts and not the secondary amino group of the piperidine nucleus (although secondary (cyclo-) aliphatic amines are normally converted almost instantaneously into the urea). 4-Amino-2,2,6,6-tetramethyl-piperidine thus acts as a chain breaker in the chain-lengthening reaction to form the polyurethane. This can also be recognised by the drop in solution viscosity and molecular weight characterised by the ηi-value. If the quantity of 4-amino-2,2,6,6-tetramethylpiperidine built into the molecule is even further increased, for examplt to 20 mol%, the viscosity drops even lower (5.6 poises/c=21%) and the molecular weight also drops sharply (ηi-value=0.6).

Excessive lowering of the molecular weight is in most cases undesirable. For linear polyurethanes, the ηi-value should generally be $\geq 0.8$, preferably $\geq 1.0$.

(D) Use of 1% of a phenolic stabilizer in comparison solution A

1% by weight of the phenolic antioxidant represented by the following formula:

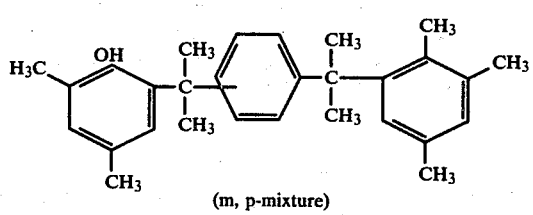

(m, p-mixture)

(quantity based on solid elastomer material) are added to portions of elastomer solution A (not containing the built-in stabilizer according to the invention).

(E) Addition of 1% of phenolic stabilizer (see Example D) to solution B (0.47% by weight of built-in stabilizer according to the invention).

(F) Addition of 1% of phenolic stabilizer (see Example D) to solution C (containing 0.94% by weight of built-in stabilizer according to the invention).

(G) Use of 0.5% of tetramethylpiperidine stabilizer Tinuvin 770 (Trade Mark) in Solution A (Comparison Example).

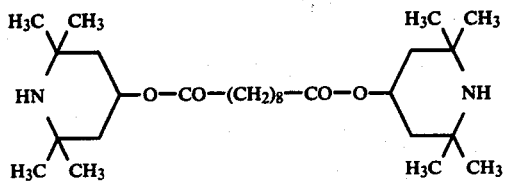

The pigmented elastomer solutions (A to F) are cast to form foils. These are in part extracted with perchloroethylene (60 min/50° C.), cut up into strips and exposed in the Fadeometer. The results are shown in Table 2. Another part of the foils is cut up into fibres and exposed in the Fadeometer for 22, 66, 88 and 110 hours. The residual strength (in % of the original strength in the unexposed films) and the elongation at break are also shown in Table 1. The residual strength (in %) and elongation at break of fibres which have been extracted with perchloroethylene (exposure time 66 Fadeometer hours) are also shown in Table 2.

As can be seen from the results of Fadeometer exposure (Table 2), the unstabilized substance A already starts to undergo severe degradation after 22 hours and is yellow and completely destroyed after 44 hours. When a phenolic stabilizer according to the known art (substance D) is used, noticeable stabilization is achieved. Up to 44 hours, the substance is colourless and the tensile strength well preserved. Slight discolouration and noticeable polymer degradation appear at 66 hours. When substance D is treated with perchloroethylene, however, the stabilizer action is to a large extent removed. In that case, discolouration and marked polymer degradation are detected after only 22 and 44 hours; at 66 and 88 hours Fadeometer exposure, the extracted substance D is just as severely discoloured and completely destroyed as the unstabilized substance A. A similar stabilizing effect is obtained with 0.50% by weight of the commercial stabilizer Tinuvin 770 (Ciba-Geigy) in substance G. The satisfactory stabilizing effect observed for up to 88 hours almost completely disappears after extraction with perchloroethylene, that is to say the substance turns yellow and loses its strength in the same way as the unstabilized polyurethane A.

By contrast, the incorporation of stabilizer according to the invention (Substances B and C), even in quantities of only 0.47% by weight (B), produces an excellent stabilizing effect in the polyurethane. This stabilizing effect is undiminished even after treatment with perchloroethylene, the substance remaining colourless while the surface of film remains smooth and without the formation of cracks on the surface when stretched; the ultimate tensile strength is for the most part preserved.

The results of stabilization according to the invention are superior to all stabilizations hitherto known in the art. Even the extraordinarily sensitive polyether urethane with a hard segment of aromatic diisocyanate (severe discolouring) and diamine chain lengthening (that is to say, a urea segment which is sensitive to degradation) is given excellent protection and undergoes no discolouration reaction up to very high intensities of light. Moreover, the stabilization according to the invention is resistant to extraction by chemical cleaning solvents and to extraction in aqueous and in particular slightly acid treatment baths, whereas the stabilizer G is washed out of foils by treatment with 1% acetic acid at 95° C. for 60 minutes.

The addition of phenolic antioxidants leads to further improvement in the stability to light but this stabilizer component is extracted by treatment with perchloroethylene. On the whole, only the stabilization which has been built into the polymer in accordance with the invention remains after extraction (see B/E with and without extraction with the per-compound).

When wet spun fibres are dyed for comparison with 2% of the red dye, Colour Index No. 23 635, in 1% acetic acid solution (one hour), the following results are obtained:

(A) very slightly dyed fibres practically no abrasion
(G) slightly or patchily dyed very severe abrasion fibres
(B) medium deep, uniformly dyed no abrasion fibres
(C) deep and uniformly dyed no abrasion fibres Apart from a small quantity of amino end groups of the ethylene diamine chain-lengthening agent, substance A contains no amino groups which could bind the acid dye.

In fibres B and C according to the invention, the basic groups (secondary NH residue of the piperidine) act as salt-forming groups for the acid dyes.

By comparison, in G the stabilizer is in part extracted and forms dye salt precipitates on the surface of the fibres, thereby spoiling the quality of the dyeing as well as the fastness to abrasion.

Table 2

| | | Fadeometer exposure (in hours) of film strips or fibres (measurement of tensile strength) | | | | | |
|---|---|---|---|---|---|---|---|
| | | Unexposed | 22 | 44 | 66 | 88 | 110 hours |
| Comparison Experiments | Example 1 (A) without built-in stabilizer | | yellow, strength to a large extent destroyed (0.10 g/dtex) | yellow, without strength (destroyed) | — | — | — |
| | per extraction$^{(x)}$ | | | " | | | |
| | (G) without built-in stabilizer but with addition of 0.5% of Tinuvin 700 | | colourless, strength preserved | colourless | colourless | colourless | strength to a large extent preserved |
| | per extraction | | yellow, marked degradation | yellow, no strength | yellow, no strength | | totally destroyed |
| | (D) no built-in stabilizer but 1% phenolic antioxidant$^{(xx)}$ | 100% of tensile strength, 690% elongation | colourless, strength preserved | colourless, strength well preserved | slightly yellowish, 78% of tensile strength, 550% elongation | slightly yellowish, strength to a large extent destroyed | yellow, no strength left |
| | per-extraction | | slightly yellowish, severe loss of strength | yellow, no strength | yellow, no strength (fibre completely destroyed) | | |
| | (R) 5 mol% built-in stabilizer (about 0.47% by weight) | (0.57 g/dtex) 100% of tensile strength, 750% elongation | colourless, strength preserved (0.51 g/dtex) 90% of tensile strength, 685% elongation | colourless, strength preserved | colourless, strength largely preserved (0.40 g/dtex) 70% of tensile strength 660% elongation | colourless, strength stiff preserved (0.30 g/dtex) 54% of tensile strength, 610% elongation | almost colourless, about half strength (0.27% g/dtex) 47% of tensile strength 600% elongation |
| | per-extraction | 100% of tensile strength | (colourless) | colourless largely | —behaviour same as without extraction— (0.36 g/dtex) 63% of tensile strength, 630% elongation | (almost colourless) | |
| | (E) 5 mol% of built-in stabilizer plus 1% by weight of phenolic antioxidant$^{(xx)}$ | 100% of tensile strength, 760% elongation | colourless strength 100% of tensile strength, 760% elongation | colourless | colourless pre-served 99% of tensile strength 780% elongation | colourless 80% of tensile strength, 735% elongation | colourless, about half strength 48% of tensile strength, 670% elongation |
| | per-extraction | 100% of tensile strength | colourless | colourless | colourless strength approximately as without antioxidant 67% of tensile strength, 665% elongation | colourless | colourless |
| | (C) 10 mol% built-in stabilizer (about 0.94% by | 100% of tensile strength, 900% elongation | colourless 100% of tensile strength, 800% | colourless | colourless 79% of tensile strength, 680% | colourless 78% of tensile strength, 680% | almost colourless 50% of tensile strength, 475 |

Table 2-continued

| | Fadeometer exposure (in hours) of film strips or fibres (measurement of tensile strength) | | | | | |
|---|---|---|---|---|---|---|
| | Unexposed | 22 | 44 | 66 | 88 | 110 hours |
| weight) per-extraction | 100% of tensile strength, 900% elongation | elongation colourless | colourless | elongation colourless 79% of tensile strength, 690% elongation | elongation colourless | % elongation colourless |

(x) Per-extraction: Film strips are shaken for 60 minutes in freshly distilled perchloroethylene at 50° C. and then dried under vacuum (60 minutes) at 50° C.; extracted cut fibres are examined only after 66 Fadeometer hours.
(xx) Phenolic antioxidant represented by the formula:

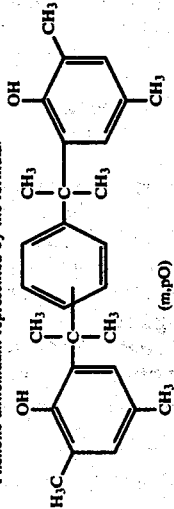

(m,pO)

EXAMPLE 2

Isocyanate prepolymer solution

An isocyanate prepolymer solution having an isocyanate content of 2.13% is prepared from the starting materials used in Example 1 by a 30 minute reaction at 40° to 50° C.

(A) Chain lengthening with semicarbazido-propionic acid hydrazide (Comparison experiment without molecular incorporation of stabilizer)

4.38 Parts of β-semicarbazido-propionic acid hydrazide ($H_2N.NH.CO.NH.CH_2.CH_2.CO.NH.NH_2$) are dissolved in 9 parts of warm water, diluted with 314 parts of dimethylformamide and mixed with 100 parts of the above isocyanate prepolymer solution with vigorous stirring. A colourless, not quite homogeneous solution (containing small jelly-like lumps) is obtained. When the solution has been pigmented with 4% of $TiO_2$, its solution viscosity is 460 poises/c=19.7%. ηi-value 1.04.

(B) Chain lengthening with 95 mol% of semicarbazido-propionic acid hydrazide/5 mol% of 4-amino-2,2,6,6-tetramethylpiperidine 4.16 parts of β-semicarbazido-propionic acid hydrazide and 0.432 parts of 4-amino-2,2,6,6-tetramethylpiperidine are dissolved in 9 parts of water and 311 parts of dimethyl formamide and mixed with 407.5 parts of the above isocyanate prepolymer solution with stirring. A clear, colourless, homogeneous solution is obtained which, after pigmentation, has a viscosity of 123 poises/c=21%. The ηi-value is 0.9.

0.47% by weight of the stabilizer are built into the polyurethane.

(C) Chain lengthening with 90 mol% of semicarbazido-propionic acid hydrazide/10 mol% of 4-amino-2,2,6,6-tetramethylpiperidine 3.95 Parts of β-semicarbazido-propionic acid hydrazide and 0.864 parts of 4-amino-2,2,6,6-tetramethylpiperidine are dissolved in 8 parts of water and 311 parts of dimethylformamide; 107.5 parts of the isocyanate prepolymer solution are added with stirring. The colourless, homogeneous elastomer solution obtained is pigmented with 4% of $TiO_2$. It has a viscosity of 36 poises. The stabilizer content is 0.95% and the ηi-value is 0.8. 1% of the phenolic stabilizer used in Example 1 is added to each of the elastomer solutions A, B and C:

(D) = Solution A (without built-in stabilizer) plus 1% of phenolic stabilizer (Comparison experiment)
(E) = solution B (0.47% of built-in stabilizer) plus 1% of phenolic stabilizer
(F) = solution C (0.95% of built-in stabilizer) plus 1% of phenolic stabilizer.

Solutions A to F are cast to form foils which are then exposed in the form of strips. Part of the foils is extracted in perchloroethylene for one hour at 50° C. nd also exposed in the Fadeometer (22, 44, 66, 88 and 154 hours)

Whereas the unstabilized films A start to discolour after an exposure time of 44 hours and are severely degraded, the stabilizer in film D initially has a stabilizing effect but is completely extracted with perchloroethylene (the same degradation and discolouration as in A). Films B and C as well as E and F are colourless even up to 154 hours exposure in the Fadeometer and the tensile strength is well preserved. The extraction treatment leads to no visible deterioration. The films remained colourless even after extraction.

The elastomer solutions A, B and C are converted into fibres by the wet spinning process (coagulation in 80% water/DMF baths at 60° C.). The fibres are dyed with 2% of a red acid dye (Colour Index No. 23 635) in weak acetic acid solution. Fibre A takes up practically no colour (only pale pink tinge). Fibres B and C are dyed an intense red and almost completely exhaust the dye bath. The molecular incorporation of the secondary amino group (approximately 30 and 60 milliequivalents, respectively, of NH/kg of elastomer) results in a considerable improvement in the dye absorption. The dyeings are fast to abrasion since migration of the basic stabilizer is impossible.

(D) Mixture of polyurethanes containing stabilizer and polyurethanes free from stabilizer.

When equal parts of solutions of Example 2 C and solutions of Example 2 A are mixed and the stabilizing effect is examined, the result is found to be practically identical to that obtained with the polyurethane of Example 2 B.

EXAMPLE 3

1200 Parts of polytetramethylene ether diol (OH number 56), 23.2 parts of N-methyl-bis-(β-hydroxypropyl)-amine, 321.4 parts of diphenylmethane-4,4'-diisocyanate, and 386 parts of dimethylformamide are heated to 40° C. for one hour, that is to say until the isocyanate content of the isocyanate prepolymer solution is 2.62% (based on the solid material).

(A) Chain lengthening with β-semicarbazidopropionic acid hydrazide (Comparison Experiments)

8.63 Parts of semicarbazidopropionic acid hydrazide in 17 parts of water and 450 parts of dimethylformamide are introduced into the reaction vessel and 215 parts of the isocyanate prepolymer solution are added. A highly viscous elastomer solution is formed and after dilution with 210 parts of dimethylformamide and pigmentation with 4% of $TiO_2$ (rutile), has a viscosity of 920 poises (c=20%) and an intrinsic viscosity of 1.153 (10 g/l in hexamethyl phosphoramide).

(B) Chain lengthening with 95 mol% of β-semicarbazidopropionic acid hydrazide and 5 mol% of 4-aminotetramethyl-piperidine 4.12 parts of β-semicarbazide-propionic acid hydrazide and 0.42 parts of 4-amino-2,2,6,6-tetramethylpiperidine are dissolved in 320 parts of dimethylformamide, mixed with 107.5 parts of the isocyanate prepolymer solution, pigmented with 4% of $TiO_2$ and heated to 50° C. for 2 hours. After the resulting solution has been left to stand overnight, its viscosity is 200 poises and its intrinsic viscosity is 0.93.

EXAMPLE 4

(a) Isocyanate prepolymer

1200 Parts of a polymer of hexane-1,6-diol/2,2-dimethylpropanediol-(1,3)/adipic acid ester having a molecular weight of 1875 (molar ratio of glycols 65/35), 23.2 parts of N-methyl-bis-(β-hydroxypropyl)-amine, 329 parts of diphenylmethane-4,4-diisocyanate and 390 parts of dimethylformamide are reacted together at 50° C. to form an isocyanate prepolymer having an isocyanate content of 2.77% (based on the solids content).

(b) Chain lengthening with ethylene diamine (Comparison experiment without stabilizer)

30 Parts of dry ice followed by 1075 parts of prepolymer (a) are added to 17.2 parts of ethylene diamine in 2280 parts of dimethylformamide, which is then pigmented with 4% of $TiO_2$. The 26% solution has a viscosity of 600 poises and turns into a paste after one day.

(c) Co-chain lengthening with 95 mol% of ethylene diamine and 5 mol% of N,N-dimethylhydrazine (Comparison experiment)

16.12 parts of ethylene diamine and 1.73 parts of N,N-dimethylhydrazine in 2280 parts of dimethylformamide are stirred with about 30 parts of dry ice ($CO_2$) and 1075 parts of prepolymer (a) and pigmented with 4% of $TiO_2$. The elastomer solution has a viscosity of 128 poises.

(d) Co-chain lengthening with 95 mol % of ethylene diamine and 5 mol % of 1-amino-3-diethylaminopropane (Comparison experiment)

16.12 Parts of ethylene diamine and 3.75 parts of 1-amino-3-diethylaminopropane are dissolved in 2280 parts of dimethylformamide. 1075 Parts of prepolymer and 4% by weight of $TiO_2$ are added.

(e) Co-chain lengthening with 95 mol% of ethylene diamine and 5 mol % of picolinic acid hydrazide (Comparison experiment 16.12 Parts of ethylene diamine and 3.95 parts of picolinic acid hydrazide in 2280 parts of dimethylformamide are stirred with 30 parts of dry ice and 1075 parts of isocyanate prepolymer solution (a) and then pigmented with 4% of $TiO_2$ (in the solid material). The 26% solution has a viscosity of 31 poises and an $\eta i$-value of 0.71(1% in hexamethylphosphoramide).

(f) Co-chain lengthening with 95 mol% of ethylene diamine and 5 mol% of isonicotinic acid hydrazide (Comparison experiment)

The reaction is carried out as under (e) but with isonicotinic acid hydrazide and yields a solution having a viscosity of 26 poises/20% and an $\eta i$ of 0.70.

(g) Co-chain lengthening with 95 mol % of ethylene diamine and 5 mol% of stabilizer H-12 (according to the invention)

30 Parts of dry ice and 1075 parts of the prepolymer (a) are added to 16.3 parts of ethylene diamine and 6.5 parts of 4-N-methyl-, N-(γ-aminopropyl)-amino-2,2,6,6-tetramethylpiperidine in 2280 parts of dimethylformamide. An elastomer solution is formed, which has a viscosity of 43 poises and remains fluid for several days. The polymer contains 0.7% by weight of stabilizer built into the moleculer, and its $\eta i$-value is 0.8 (10 g/l in hexamethylphosphoramide).

(h) Co-chain lengthening with 5 mol% of reactive stabilizer (according to the invention)

15.28 Parts of ethylene diamine, 1.90 parts of 1,5,11-triaminoundecane and 4.42 parts of 4-amino-2,2,6,6-tetramethyl-piperidine are dissolved in 2280 parts of dimethylformamide, converted into the carbamate with 30 parts of $CO_2$ and reacted with 1075 parts of the isocyanate prepolymer solution (a) to form a clear, colourless solution which remains highly fluid for several weeks. After pigmentation with 4% of $TiO_2$, the solution has a viscosity of 170 poises and an $\eta i$-value of 1.0 (10 g/l in hexamethylphosphoramide). The polyurethane contains approximately 0.5% by weight of stabilizer built into the molecule.

Solutions b to h are cast to form foils which are cut up into strips and exposed in the Fadeometer. In the foils containing built-in stabilizer according to the invention, both the discolouration and the reduction in strength are markedly reduced compared with the unstabilized film (b) as well as compared with comparison samples c to f containing built-in compounds which have been proposed for purposes of stabilization in the known art. These comparison films according to the known art show no signs of stabilization or at most only a slight initial stabilization compared with film (b) which contains no built-in modifiers.

The following discolourations were observed after Fadeometer exposure:

|  | After 44 hours | After 88 hours | After 154 hours |
|---|---|---|---|
| Foil b | yellow brown | yellow brown | brownish yellow |
| Foils c-f | yellowish brown | yellow brown | brownish yellow-completely degraded |
| Foils g-h | almost colourless | pale yellowish | pale yellow, strength good |

EXAMPLE 5

(a) Isocyanate prepolymer formation

1000 Parts of the copolyester from Example 4 (MW 1875), 19.8 parts of N-methyl-bis-(β-hydroxyethyl)-amine, 281 parts of diphenylmethane-4,4'-diisocyanate and 325 parts of dimethylformamide are heated to 46°-50° C. for 70 minutes to form an isocyanate prepolymer solution (2.815% NCO based on solid material).

(b) Chain lengthening with semicarbazido-propionic acid hydrazide (Comparison experiment)

9.3 Parts of β-semicarbazidopropionic acid hydrazide are dissolved in 18 parts of water and 452 parts of dimethylformamide. 215 Parts of the prepolymer solution (a) are added and the resulting viscous elastomer solution is pigmented with 4% of $TiO_2$.

(c) Incorporation of reactive stabilizer (according to the invention)

3.71 Parts of β-semicarbazidopropionic acid hydrazide are dissolved in 7 parts of water and 200 parts of dimethylformamide. 70 Parts of the isocyanate prepolymer solution (a) are added. 1.8 Parts of 4-amino-2,2,6,6-tetramethylpiperidine in 28 parts of dimethylformamide are mixed into this solution with stirring and a further 37.5 parts of the isocyanate prepolymer solution are added. The resulting viscous elastomer solution is pigmented with 4% of $TiO_2$ (1.97% of built-in stabilizer).

(d) Elastomer solution (b) plus 1.97% of stabilizer from Example (c) (additive addition—Comparison example)

1.97% of 4-amino-2,2,6,6-tetramethyl-piperidine (based on the quantity of solid substance) are dissolved as an additive in elastomer solution (b).

(e) Incorporation of a reactive stabilizer (according to the invention)

3.71 Parts of β-semicarbazido-propionic acid hydrazide are dissolved in 7 parts of water and 200 parts of dimethyl formamide. The solution is pigmented with 3.7 parts of $TiO_2$, and 60 parts of the isocyanate prepolymer solution are added with stirring. 2.42 Parts of 4-(β-cyanoethyl)-amino-2,2,6,6-tetramethyl-piperidine in 28 parts of dimethylformamide are stirred into the resulting solution, and 47.5 parts of the remaining isocyanate prepolymer solution are added to complete the polyaddition reaction (equivalent reaction).

Elastomer solutions (b) to (e) are dried to form films about 0.2 mm in thickness which are exposed as strips in the Fadeometer. A part of the films is extracted with boiling carbon tetrachloride for one hour and exposed to light for comparison to test the stability of the stabilization.

As can be seen from a comparison of the exposure results, the molecular incorporation of the reactive stabilizers produces a marked stabilization of the polyurethanes against discolouration and degradation (see (c) and (e)). This stabilization is also resistant to extraction, whereas the same stabilizers used as additives undergo extraction with virtually complete loss of their effect.

The discolourations observed on the foils as a result of exposure in the Fadeometer are shown in Table 3.

Table 3

|  | after 44 hours | after 66 hours | after 88 hours |
| --- | --- | --- | --- |
| Foil b) - without stabilizer (comparison experiment) | yellow | yellow | yellow brown |
| ditto, extracted | yellow | yellow | yellow brown |
| Foil c) according to the invention) | colourless | almost colourless | slightly yellowish |
| ditto, extracted | colourless | almost colourless | slightly yellowish |
| Foil d) - additive addition of stabilizer (comparison experiment | almost colourless | yellowish | yellow |
| ditto, extracted | yellow | yellow | yellow brown |
| Foil e) according to the invention) | colourless | almost colourless | almost colourless |
| ditto, extracted |  | almost colourless | almost colourless |

EXAMPLE 6

(a) Isocyanate prepolymer formation

12000 Parts of polytetramethylene ether diol (Polymeg 2000 of Quaker Oats Co.—molecular weight 2000), 229 Parts of N-methyl-bis-(β-hydroxy-propyl)-amine, 2954 parts of diphenylmethane-4,4'-diisocyanate and 3824 parts of dimethylformamide are reacted together at 40° C. for 40 minutes to form an isocyanate prepolymer solution having an isocyanate content of 2.35% (based on the solids content).

(A) Chain lengthening with ethylene diamine (Comparison experiment)

14.43 Parts of ethylene diamine are dissolved in 2700 parts of dimethylformamide. 20 Parts of dry ice ($CO_2$) are added to form the carbamate, and 1075 parts of the isocyanate prepolymer solution (a) are then added. After pigmentation with 4% of $TiO_2$ (based on solid material), the solution has a viscosity of 91 poises.

(B) Incorporation of 10 mol% of 4-alkyl-4-(γ-aminopropyl)amino-2,2,6,6-tetraalkyl-piperidine 20 Parts of dry ice followed by 1075 parts of the isocyanate prepolymer solution are added to 12.95 parts of ethylene diamine and 10.9 parts of 4-methyl-4-(γ-aminopropyl)-amino-2,2,6,6-tetramethyl piperidine (see method of preparation 12) and 2700 parts of dimethylformamide. After pigmentation (4% of $TiO_2$ rutile) the elastomer solution has a viscosity of 20 poises.

(C) Incorporation of 10 mol% of 4-hydroxy-4-carbomethoxy-2,2,6,6-tetramethyl-piperidine 12.95 Parts of ethylene diamine in 2000 parts of dimethylformamide are introduced into 10.33 parts of 4-hydroxy-4-carbomethoxy-2,2,6,6-tetramethyl-piperidine and 700 parts of dimethylformamide and reacted with 1075 parts of the prepolymer solution (a) for one hour. After pigmentation with 4% of $TiO_2$, the viscosity of the solution is 155 poises (about 1.2% of fixed stabilizer). The ηi-value (10 g/l in HMPA) is 0.92.

(D) Incorporation of 10 mol% of 4-(β-cyanoethyl)-amino-2,2,6,6-tetramethyl-piperidine 6.48 Parts of ethylene diamine and 5.0 parts of 4-(β-cyanoethyl)-amino-2,2,6,6-tetramethylpiperidine (method of preparation 10) in 1360 parts of dimethyl formamide are converted into the carbamate suspension by the addition of 20 parts of dry ice and reacted with 537.5 parts of the isocyanate prepolymer solution (a) which are added to the suspension, to form a viscous elastomer solution. After pigmentation with 4% of rutile, the viscosity is 60 poises (approximately 1.1% stabilizer fixed in the polymer). The ηi-value (10 g/l in hexamethylphosphoramide (HMPA)) is 0.82.

(E) Incorporation of 10 mol% of 4-hydroxy-4-cyano-2,2,6,6-tetramethyl-piperidine 6.48 parts of ethylene diamine and 4.37 parts of 4-hydroxy-4-cyano-2,2,6,6-tetramethyl-piperidine are dissolved in 1360 parts of dimethylformamide. 20 Parts of dry ice are added, followed by 537.5 parts of the isocyanate prepolymer solution (a). The resulting viscous elastomer solution is pigmented with 4% of rutile. It then has a viscosity of 150 poises/20% (approximately 1% stabilizer fixed in the polymer). The ηi-value is 1.06 (10 g/l in HMPA).

The results of stabilization are shown in Table 4 which shows that the molecular incorporation of stabilizers based on 4-amino derivatives (compare B and D) produces an excellent stabilizing effect which is resistant to extraction. The incorporation of stabilizers based on 4-hydroxy derivatives (compare C and E) is less effective.

EXAMPLE 7

Isocyanate prepolymer formation

An isocyanate prepolymer solution is prepared as in Example 6. After a reaction time of 60 minutes at 40° C., the isocyanate content is 2.20% NCO (in the solid material).

(A) Chain lengthening with hydrazine hydrate (Comparison experiment)

20 Parts of dry ice followed by 1075 parts of the isocyanate prepolymer are added to 11.27 parts of hydrazine hydrate in 2700 parts of dimethylformamide, and the viscous elastomer solution (125 poises) is pigmented with 4% of $TiO_2$ (rutile).

(B) Incorporation of 10 mol% of 4-amino-2,2,6,6-tetramethylpiperidine

20 Parts of dry ice followed by 1075 parts of the isocyanate prepolymer solution (a) are added to 10.15 parts of hydrazine hydrate and 7.03 parts of 4-amino-2,2,6,6-tetramethylpiperidine in 2700 parts of dimethylformamide. The viscous elastomer solution (28 poises) is pigmented with 4% of rutile (approximately 0.8% of stabilizer fixed in the polymer).

The results of stabilization after Fadeometer exposure are shown in Table 4. They show excellent and extraction-resistant stabilization by the 4-amino derivative.

Table 4

Fadeometer exposure of cut fibres after 44 and 88 hours

| Example | Definition | After-treatment | After 44 hours Residual TS % | Elong. % | After 88 hours Residual TS % | Elong. % | Remarks |
|---|---|---|---|---|---|---|---|
| Ethylene diamine chain lengthening: | | | | | | | |
| 6 A | (Comparison) | none | No longer measurable yellow | | No longer measurable - destroyed - intense yellow | | |
| | | per | No longer measurable yellow | | No longer measurable - destroyed - intense yellow | | |
| 6 B | 4-N-methyl-(γ-amino)-propyl-TM-pip | with and without per per | Colourless, fully elastic films | | Colourless, fully elastic films | | Even after 154 hours colourless and completely elastic even after extraction |
| 6 C<br>6 E | 4-hydroxy derivatives | with and without per | Pale yellow, slightly reduced tensile strength | | Yellow, reduced tensile strength | | Stabilizing effect weaker than in B/D |
| 6 D | 4-Amino-4-cyano-ethyl-TM-pip | with and without per | Colourless, fully elastic films | | Colourless, fully elastic films | | Even after 154 hours foils are colourless and fully elastic, even after extraction |
| Hydrazine chain lengthening: | | | | | | | |
| 7 A | Comparison experiment | without | 22% yellow | 430% | No longer measurable - destroyed, intense yellow | | |
| | | per | 22% | 450% | No longer measurable - destroyed, intense yellow | | |
| 7 B | 0.8% 4-amino-TM-pip | without | 100% | 810% colourless | 90% | 740% colourless | (foils still colourless after 154 hours and strength well preserved, both original and per-extracted. Measurements broken off) |
| | | per | 100% | 750% colourless | 80% | 755% colourless | |

EXAMPLE 8

(A) Chain lengthening with semicarbazido-propionic acid hydrazide (Comparison experiment)

36.3 Parts of β-semicarbazido-propionic acid hydrazide are dissolved in 72 parts of water and 269 parts of dimethylformamide and stirred with 1075 parts of the isocyanate prepolymer solution from Example 7(a). The viscous (290 poises) elastomer solution is pigmented with 4% of TiO₂.

(B) Incorporation of 10 mol% of 4-N-methyl-4-N-(γ-aminopropyl)-amino-2,2,6,6-tetramethyl-piperidine 32.7 Parts of β-semicarbazidopropionic acid hydrazide are dissolved in 72 parts of water and 1000 parts of dimethylformamide. 575 Parts of the isocyanate prepolymer solution from Example 7(a) are added. 10.23 parts of 4-N-methyl-, N-(γ-aminopropyl)-amino-2,2,6,6-tetramethyl-piperidine (method of preparation 12) and 1700 parts of dimethylformamide, followed by 500 parts of more isocyanate prepolymer solution, are introduced into this solution to form a viscous, homogeneous elastomer solution which does not change into a paste. After pigmentation with 4% of TiO₂ (rutile), the solution viscosity is 75 poises (approximately 1.13% of stabilizer fixed in the polymer).

(C) Incorporation of 10 mol% of 4-hydroxy-4-carbomethoxy-2,2,6,6-tetramethyl-piperidine 9.7 Parts of 4-hydroxy-4-carbomethoxy-2,2,6,6-tetramethylpiperidine are dissolved in 575 parts of dimethylformamide. 1075 parts of the isocyanate prepolymer solution according to Example 7(a) are added. After a reaction time of 30 minutes, this mixture is stirred into a solution of 32.7 parts of β-semicarbazido-propionic acid hydrazide in 65 parts of water and 500 parts of dimethylformamide. A viscous, homogeneous elastomer solution which is stable to conversion into a paste is obtained (1.07% of stabilizer fixed in the polymer).

(D) Incorporation of 10 mol% of 4-(β-cyanoethyl)-amino-2,2,6,6-tetramethyl-piperidine 537.5 Parts of the isocyanate prepolymer solution from Example 7(a) are added to 4.72 parts of 4-(β-cyanoethyl)-amino-2,2,6,6-tetramethyl-piperidine and 16.35 parts of β-semicarbazidopropionic acid hydrazide dissolved in 33 parts of water. The homogeneous elastomer solution obtained after pigmentation (4% of TiO₂) is resistant to conversion into a paste and has a viscosity of 35 poises (1.05% of stabilizer fixed in the polymer).

(E) Incorporation of 10 mol% of 4-hydroxy-4-cyano-2,2,6,6-tetramethyl-piperidine 537.5 Parts of the isocyanate prepolymer solution are added to 4.08 parts of 4-hydroxy-4-cyano-2,2,6,6-tetramethylpiperidine in 575 parts of dimethylformamide. After 30 minutes, a solution of 16.35 parts of β-semicarbazidopropionic acid hydrazide, 32 parts of water and 500 parts of dimethylformamide is added. After pigmentation with 4% of TiO₂, a viscous elastomer solution having a viscosity of 300 poises and a concentration of 20% is obtained (approximately 0.89% of stabilizer in the polymer). The ηi-value is 1.17 (10 g/l in HMPA).

(F) to (O) Incorporation of other stabilizers

The method used is the same as in Example D but, instead of 4.08 parts of 4-N-(β-cyanoethyl)-amino-2,2,6,6-tetramethyl-piperidine, the stabilizers shown in Table 5 are added in the quantities indicated.

Table 5

| No. | (structure with H-N-R₃ on tetramethylpiperidine) R₃ = | Method of preparation No. | Quantity used in Example D in parts | % by weight of stabilizer in the polyurethane |
|---|---|---|---|---|
| F | —CH₃ | 1 | 3.85 | 0.89 |
| G | —CH₂—CH₂—CH₃ | 2 | 4.47 | 1.02 |
| H | —n-C₆H₁₃ | 3 | 5.41 | 1.24 |
| I | —cyclohexyl | 4 | 5.41 | 1.24 |
| K | —n-C₁₂H₂₅ | 5 | 7.30 | 1.67 |
| L | —CH(CH₃)₂ | 6 | 4.47 | 1.02 |
| M | —CH₂.CH(CH₃)₂ | 7 | 4.79 | 1.10 |
| N | —CH(CH₃)CH₂—CH(CH₃)₂ | 8 | 5.48 | 1.26 |
| O | —CH₂—C₆H₅ | 9 | 5.54 | 1.27 |

RESISTANCE TO NO

The polyurethane films A, B and D are subjected to a nitric oxide resistance test according to DIN 54025. While film (A) undergoes slight yellow discolouration when severely tested (3 cycles), films (B) and (D) remain white without change. Films (B) and (D) are still colourless even when the severity of the test is increased to 3×3 NO gels (9 NO gels).

The films according to Example 4b and 4h are similarly subjected to the triple NO test according to DIN 54025. Film 4b becomes distinctly yellow but the stabilized film 4h remains unchanged.

Table 6

Residual tensile strength (in % of original strength), elongation at break (%) and discolouration after Fadeometer exposure

| Example No. | Description | After-treatment | 44 hours % residual TS | % elong. | 88 hours % residual TS | % elong. | Remarks |
|---|---|---|---|---|---|---|---|
| Chain lengthener: β-semicarbazidopropionic acid hydrazide | | | | | | | |
| 8A | without stabilizer (comparison) | — | destroyed (10%) no longer measurable yellow | | destroyed | | |
| 8B | 1.13% by weight stabilizer | none | 100% colourless | 770% | 87% colourless | 695% | After 154 hours, both films still almost |
| | | per | 100% colourless | 780% | 80% colourless | 720% | colourless and well stabilized |
| 8C | 1.07% stabilizer | none | 25% yellow | 405% | — yellow | | (4-Hydroxy derivatives are less stabilizing than 4-amino derivatives) |
| 8D | 1.05% stabilizer | none | 100% colourless | 765% | 100% colourless | 665% | After 154 hours, both films are still almost |
| | | per | 100% colourless | 705% | 100% colourless | 745% | colourless and stabilization is excellent |
| 8E | 0.89% stabilizer | — | 28% yellow | 415% | — | | (4-Hydroxy derivatives are less effective as stabilizers than the preferred 4-amino derivatives) |
| F-O | 0.89–1.27 (see Table 5) | none per | All films are colourless after 44/88 hours and the tensile strength and elastic values are very well preserved. After 154 hours' exposure, when films F, G, H, I, K and L were colourless and films M, N, O almost colourless, the test was stopped (as also with the above films A–E). Stabilization was not reduced by treatment with perchlorethylene at 50°/60 min (per) and proved to be resistant to extraction. | | | | |

EXAMPLE 9

Isocyanate prepolymer formation

500 Parts of a polyester of adipic acid, hexane-1,6-diol and neopentyl glycol having a molecular weight of 1955 (molar ratio of glycols 65:35) are heated to 80° C. for 2 hours with 192.2 parts of diphenylmethane-4,4'-diisocyanate and 173 parts of chlorobenzene until the isocyanate content of the solution is 4.895%.

(A) Chain lengthening with butanediol (Comparison)

10.49 Parts of butane-1,4-diol are heated to 110° C. with 17 parts of chlorobenzene and 200 parts of the isocyanate prepolymer for 2 hours. A solid jelly-like polymer mass is obtained, which can be dissolved by heating it in 450 parts of dimethylformamide at 50° C. for 8 hours to form a 25% elastomer solution.

(B) Incorporation of 4-hydroxy-2,2,6,6-tetramethyl-piperidine (1% by weight in the polymer)

0.8 Parts of 4-hydroxy-2,2,6,6-tetramethyl-piperidine and 5.04 parts of butane-1,4-diol are heated to 110° C. with 7 parts of chlorobenzene and 100 parts of the isocyanate prepolymer solution for 2 hours. A 25% elastomer solution is obtained by the addition of 226 parts of dimethylformamide at 50° C.

Solutions A and B are dried to form foils. These are in part extracted with perchloroethylene for one hour at 50° C. and in 1% boiling acetic acid solution for one hour, respectively, and exposed in the Fadeometer (22 hours).

Foil A (without additive) is intensely coloured yellow (brown) after 22 hours' exposure, and its strength is to a large extent destroyed. The extraction treatments have no further effect. Foil B (with built-in stabilizer) is by contrast almost colourless (slightly yellowish) after exposure and even after extraction with perchloroethylene or aqueous acetic acid its stability to discolouration and its tensile strengths are unchanged.

EXAMPLE 10

(I) Preparation of stabilizer (β) which can be built into the molecule (a) 15.6 Parts of 4-amino-2,2,4,4-tetramethyl-piperidine dissolved in 293 parts of ethanol, are added dropwise over a period of 100 minutes to a cold solution of 21.4 parts of diphenylcarbonate in 427 parts of ethanol, the solution being kept at 5° to 10° C., and the reaction mixture is left to stand overnight and then heated to 50°–70° C. for 5 hours.

(b) 802 Parts of solution (a) containing the phenylurethane α represented by the following formula:

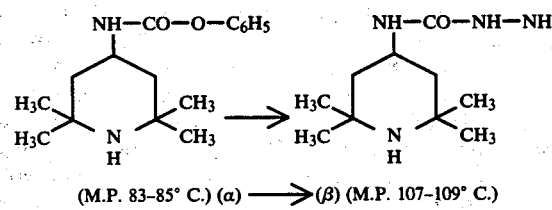

(M.P. 83–85° C.) (α) ⟶ (β) (M.P. 107–109° C.)

are mixed with a solution of 5.62 parts of hydrazine hydrate in 50 parts of ethanol, left to stand overnight and then heated to 50°–60° for 3 hours. Evaporation of the solvent leaves an oily residue which repidly crystallises. When the residue is dissolved in benzene and crystallised from petroleum ether, it has a softening range of 93° to 98° C.; after recrystallisation from boiling water it has a melting point of 107° to 109° C.

(II) Incorporation of the semicarbazide stabilizer (β) into a polyurethane 32.7 Parts of β-semicarbazidopropionic acid hydrazide and 10.25 parts of 2,2,6,6-tetramethyl-piperidino-4-semi-carbazide (β) are dissolved in 72 parts of water and 2700 parts of dimethylformamide, and stirred with 1075 parts of the isocyanate prepolymer solution from Example 7(a) to form a viscous elastomer solution. After pigmentation with 4% of $TiO_2$, the solution viscosity is 100 poises.

When this polyurethane according to the invention is exposed in the Fadeometer in the form of a film, it is still colourless after 110 Fadeometer hours and its elasticity is preserved, whereas the unstabilized film (see Example 8 A) was discoloured after only 22 hours and its tensile strength was considerably reduced.

EXAMPLE 11

(I) Preparation of the stabilizer which can be chemically incorporated (a) 17.0 Parts of 4-amino-1,2,2,6,6-pentamethyl-piperidine dissolved in 300 parts of ethanol are added dropwise over a period of 100 minutes to a solution of 21.4 parts of diphenylcarbonate in 527 parts of ethanol at 5° to 10° C., and the mixture is then heated at 50° to 70° C. for 5 hours (a sample crystallises with melting point of 122° to 125° C. from petroleum ether).

(b) 815 Parts of solution (a) containing the phenylurethane (γ) are mixed with a solution of 5.65 parts of hydrazine hydrate in 50 parts of ethanol, left to stand overnight and then heated to 60° C. for 3 hours. After evaporation of the solvent, the product is recrystallised from hot water with the addition of 10% of methanol.

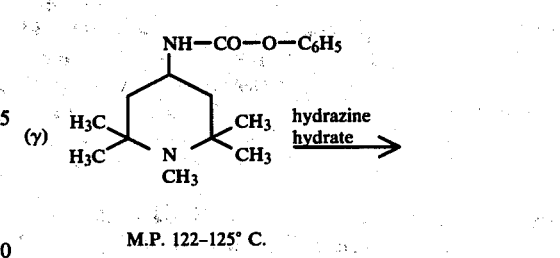

M.P. 122–125° C.

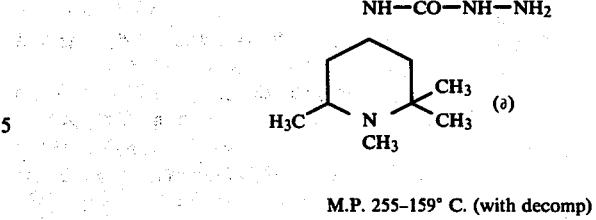

M.P. 255–159° C. (with decomp)

(II) Incorporation of 1,2,2,6,-pentamethyl-piperidine-4-semicarbazide (δ) into a polyurethane 32.7 Parts of β-semicarbazidopropionic acid hydrazide and 10.95 parts of 1,2,2,6,6-pentamethyl-piperidino-4-semicarbazide are dissolved in 72 parts of water and 2700 parts of dimethylformamide and stirred with 1075 parts of the isocyanate prepolymer solution from Example 7(a). After pigmentation with 4% of TiO₂, a viscous elastomer solution (102 poises) is obtained.

When this polyurethane according to the invention is exposed in the Fadeometer in the form of a film, the resulting foil is still colourless after 110 hours' exposure, whereas the unstabilized film (see Example 8A) was discoloured after only 22 hours and considerably damaged in its tensile strength. The stabilization of the film according to the invention is resistant to extraction.

EXAMPLE 12

(a) Isocyanate prepolymer formation 1000 parts of polytetramethylene glycol (molecular weight 2000),
18.9 parts of N-methyl-bis-(β-hydroxypropyl)-amine,
256.1 parts of diphenylmethane-4,4'-diisocyanate, and
317 parts of dimethylformamide are heated to 40° C. until the isocyanate content is 2.265% (based on solid material).

(b) Chain lengthening with β-semicarbazido-propionic acid hydrazide (Comparison experiment)

7.47 Parts of β-semicarbazido-propionic acid hydrazide are dissolved in 15 parts of water and 541 parts of dimethylformamide. 215 Parts of the prepolymer solution are added with stirring. After pigmentation with 4% of TiO₂ (rutile), a suitably viscous solution is obtained ($\eta i = 1.01$).

(c) Incorporation of 5 l mol% of 1,2,2,6,6-pentamethyl-4-amino-piperidine 0.394 Parts of 1,2,2,6,6-pentamethyl-4-amino-piperidine and 3.55 parts of β-semicarbazido-propionic acid hydrazide are dissolved in 7.0 parts of water and 270 parts of dimethylformamide. 107.5 parts of the isocyanate prepolymer solution (a) are added with stirring. A viscous elastomer solution ($\eta i = 0.95$) is obtained after pigmentation (4% of rutile).

(d) Incorporation of 10 mol% of 1,2,2,6,6-pentamethyl-4-amino-piperidine 0.79 Parts of 1,2,2,6,6-pentamethyl-4-amino-piperidine and 3.374 parts of β-semicarbazido-propionic acid hydrazide are dissolved in 7 parts of water and 270 parts of dimethyl formamide. 107.5 parts of the isocyanate prepolymer solution (a) are added. A viscous elastomer solution (28 poises) is obtained after pigmentation (4% rutile).

Solutions (c) and (d) are well stabilized in their viscosity and remain readily fluid for more than three weeks. Solution (b) turns into a paste when left to stand for 3 days.

Films are cast from the solutions and exposed in the Fadeometer as strips or cut fibres.

The unstabilized film (b) is yellow after 22 hours and its strength is considerably broken down by that time. A measurement taken after 44 hours showed a tensile strength of 0.08 g/dtex at 245% residual elongation. The films which have been stabilized according to the invention, on the other hand, show a considerable stabilization effect. After 44 hours exposure in the Fadeometer, their tensile strengths are as follows:

Film (c) 0.40 g/dtex (96% residual strength), elongation 685%
Film (d) 0.40 g/dtex (97% residual strength), elongation 800%

These values are fully preserved after extraction with perchloroethylene (1 hour/50° C.).

Films c/d are colourless up to 110 hours in the Fadeometer (even after perchloroethylene extraction) and even after 154 hours they are still almost colourless and have very good tensile strength and stretchability and form no cracks on the surface when stretched.

Wet spun and dry spun fibres obtained from solutions b-d show in principle the same behaviour (a loss of stabilizer in polymers c/d on coagulation or due to evaporation with the solvent in the dry spinning test cannot occur because the stabilizer is built into the polyurethane).

If, instead of 1,2,2,6,6-pentamethyl-4-aminopiperidine (method of preparation 15), equivalent quantities of stabilizers prepared according to methods 16–19 which can also be chemically built-in are used and if incorporation into the polyurethane is carried out as indicated in Example 12 c or 12 d, the modified polyurethanes obtained have practically the same extraction-resistant stabilization as polyurethanes 12 c/d.

EXAMPLE 13

Incorporation of 4-hydroxy-2,2,6,6-tetramethyl-piperidine into an isocyanate prepolymer (a) Isocyanate prepolymer formation 300 Parts of polytetramethylene ether diol (molecular weight 2000), 3 parts of 4-hydroxy-2,2,6,6-tetramethyl-piperidine (1% by weight, based on the polyether), 5.66 parts of N-methyl-bis-(β-hydroxypropyl)-amine and 76.14 parts of diphenylmethane-4,4'-diisocyanate are heated to 40° C. with 98 parts of dimethylformamide for 40 minutes, until isocyanate prepolymer formation takes place (2.30% of NCO in solid material).

(b) Chain lengthening with ethylene diamine

3 Parts of dry ice are added to 1.413 parts of ethylene diamine in 270 parts of dimethylformamide and the mixture is stirred with 107.5 parts of the isocyanate prepolymer (a). After pigmentation (4% of rutile), the elastomer solution obtained is dried to form foils and exposed in the Fadeometer.

(c) Chain lengthening with β-semicarbazido-propionic acid hydrazide 3.79 Parts of β-semicarbazido-propionic acid hydrazide are dissolved in 7.4 parts of water and 270 parts of dimethylformamide, stirred with 107.5 parts of the isocyanate prepolymer (a) and pigmented with 4% of rutile. The elastomer solution (32 poises) is cast to form films and exposed in the Fadeometer.

When the results of exposure of these PU films are compared with the results obtained with polyurethanes which have been chain-lengthened with ethylene diamine without the incorporation of stabilizer in the prepolymer, it is found that the films which are free from stabilizer are completely destroyed and yellow in colour after only 44 Fadeometer hours whereas polyurethanes 13 b and 13 c according to the invention are almost colourless and well preserved in their mechanical properties even after 154 hours. It is also found that the stabilizing effect is not reduced by extraction with perchloroethylene.

EXAMPLE 14

Incorporation of 4-hydroxy-1,2,2,6,6-pentamethyl-piperidine in an isocyanate prepolymer (a) Isocyanate prepolymer formation 300 Parts of polytetramethylene ether diol (molecular weight 2000), 3.0 parts of 4-hydroxy-1,2,2,6,6-pentamethylpiperidine, 5.66 parts of N-methyl-bis-(β-hydroxypropyl)amine, 75.9 parts of diphenylmethane-4,4'-diisocyanate and 96 parts of dimethylformamide are heated to 40° C. for 40 minutes to form the prepolymer (2.18% of NCO, based on the solids content).

(b) Chain lengthening with ethylene diamine 1.342 Parts of ethylene diamine in 270 parts of dimethylformamide are stirred with 3 parts of dry ice and 107.5 parts of the isocyanate prepolymer solution (a) and pigmented with 4% of rutile, and the resulting viscous solution is cast to form films.

(c) Chain lengthening with β-semicarbazido-propionic acid hydrazide 3.6 Parts of β-semicarbazido-propionic acid hydrazide are dissolved in 7.2 parts of water and 270 parts of dimethylformamide and stirred with 4% of $TiO_2$ and 107.5 parts of the isocyanate prepolymer solution. The viscous elastomer solution obtained (34 poises) is cast to form films.

The films are found to have practically the same (even slightly better) extraction-resistant stabilization as the films 12 b and 12 c.

EXAMPLE 15

(I) Preparation of polyurethanes containing stabilizer

400 Parts of a polyester of adipic acid, hexane-1,6-diol and neopentyl glycol (molar ratio of glycols 65:35) having a molecular weight of 1685 are heated to 95° C. with 79.8 parts of hexane-1,6-diisocyanate in 120 parts of chlorobenzene for 160 minutes, until the isocyanate content (based on solid material) is 4.02%. 50 Parts of the isocyanate prepolymer solution are stirred into a solution of 3.0 parts of 4-amino-2,2,6,6-tetramethyl-piperidine and 1.64 parts of isophorone diamine in 73 parts of dimethylformamide, a low viscosity solution being thereby formed.

(II) Mixture of polyurethanes

The unstabilized polyurethane solution from Example 5 b and the solution of polyurethane 15/I containing stabilizer are mixed together so that the proportion of the stabilizer, 4-amino-tetramethyl-piperidine, in the total quantity of solid material is 0.5% by weight (corresponding to 7.4% of solid content of 15/I).

When tested in the form of films, the mixture of polyurethanes shows good light fastness and little discolouration (colourless after 44 Fadometer hours, almost colourless after 66 hours, almost colourless after 88 hours).

We claim:

1. A permanently stabilized polyurethane, containing 2,2,6,6-tetraalkyl-piperidine structures chemically attached to the polyurethane molecule by a urethane or urea group.

2. A process for the preparation of a permanently stabilized polyurethane which comprises incorporating a derivative of 2,2,6,6-tetraalkyl-piperidine having an active hydrogen-containing group in a reaction mixture used for the preparation of the polyurethane.

3. The process according to claim 2, wherein the reaction mixture comprises a polyhydroxyl compound, a polyisocyanate and a chain-lengthening agent.

4. The process according to claim 2, wherein the derivative of 2,2,6,6-tetraalkyl-piperidine is represented by the following general formula:

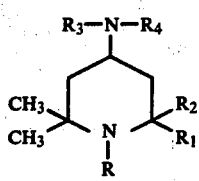

wherein
R denotes hydrogen, a straight chain or branched chain alkyl group having from 1 to 20 C-atoms, an alkenyl group having from 3 to 5 C-atoms, an aralkyl group having from 7 to 12 C-atoms, $CH_2$—$CH_2$—CN, $CH_2$—$CH_2$—COO-alkyl

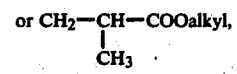

$R_1$ and $R_2$, which are identical or different, each denote a straight chain or branched chain alkyl group having from 1 to 6 C-atoms or, together with the ring carbon atoms to which they are attached, a cycloalkyl ring having from 5 to 7 C-atoms, $R_3$ denotes hydrogen, a straight chain or branched chain alkyl group having from 1 to 20 C-atoms, a cycloalkyl group having from 5 to 12 C-atoms, an aralkyl group having from 7 to 12 C-atoms, an ω-cyanoalkyl group or a β-alkoxycarbonylalkyl group having from 1 to 3 C-atoms in the alkoxy part, $R_4$ denotes hydrogen, CO—NH—$NH_2$ or, when $R_3$=H, a straight chain or branched chain alkyl group having from 1 to 20 C-atoms, a cycloalkyl group having from 5 to 12 C-atoms, an aralkyl group having from 7 to 12 C-atoms, an ω-cyanoalkyl group or a β-alkoxycarbonylalkyl group; or when $R_3$ is not H, an ω-aminoalkyl, an ω-N-alkylaminoalkyl, an ω-hydroxyalkyl or an ω-carboxylic acid hydrazidoalkyl group, and when $R_3$ and $R_4$ do not carry an active hydrogen-containing group, R may also denote an ω-aminoalkyl, β-hydroxyalkyl or β-carboxylic acid hydrazidoalkyl group.

5. The process according to claim 4, wherein the derivative of 2,2,6,6-tetraalkyl-piperidine is represented by the following general formula:

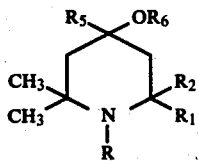

wherein R,
$R_1$ and $R_2$ have the meaning indicated in claim 4,
$R_5$ denotes hydrogen or CN, and
$R_6$ denotes hydrogen, β-hydroxyalkyl, β-or γ-aminoalkyl, $CH_2$—$CH_2$—CO—NH—$NH_2$ or $CH_2$—CH($CH_3$)—CO—NH—$NH_2$, and in cases where the groups $R_5$ and $R_6$ do not carry an active hydrogen-containing group, R may denote an ω-aminoalkyl, β-hydroxyalkyl or β-carboxylic acid hydrazidoalkyl group.

6. The process according to claim 4, wherein the derivative of 2,2,6,6-tetraalkyl-piperidine corresponds to the general formula:

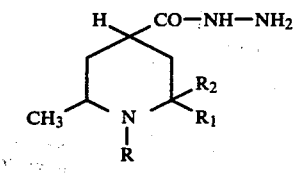

wherein

R, $R_1$ and $R_2$ have the meaning indicated in claim 4.

7. The process according to claim 2, wherein an isocyanate prepolymer, obtained by reaction of a substantially linear polyester or polyether having OH end groups with an excess quantity of a diisocyanate, is reacted in a highly polar amide solvent with a chain-lengthening agent and from 0.05 to 5%, by weight, based on the sum of reactants, of the 2,2,6,6-tetraaklyl-piperidine derivative.

8. The process according to claim 7, wherein the derivative of 2,2,6,6-tetraalkyl-piperidine is represented by the following formula:

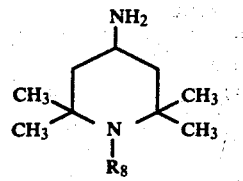

wherein $R_8$ denotes hydrogen or methyl.

9. Fibers and foils comprising a stabilized polyurethane according to claim 1.

* * * * *